Oct. 30, 1962 P. N. PRIORE 3,060,838
SUPER PIE PLATE AND CUTTER
Filed Feb. 15, 1960
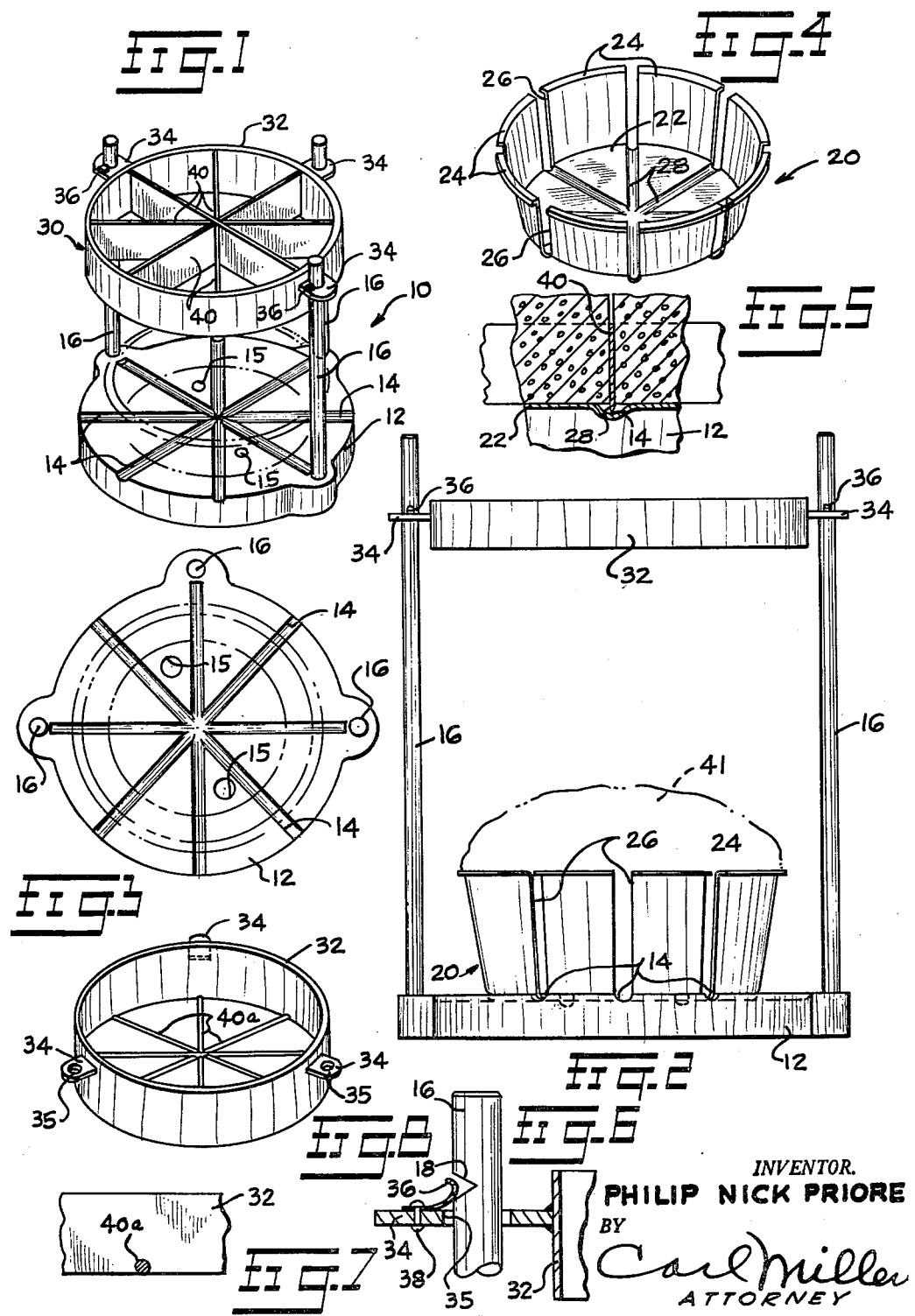
INVENTOR.
PHILIP NICK PRIORE
BY
Carl Miller
ATTORNEY

3,060,838
SUPER PIE PLATE AND CUTTER
Philip Nick Priore, 2065 Hermany Ave., Bronx 72, N.Y.
Filed Feb. 15, 1960, Ser. No. 8,647
1 Claim. (Cl. 99—430)

This invention relates to food handling apparatus and, more particularly, to a pie and cake cutter.

Ordinarily, it is difficult to cut a cake or pie into equal sections. It is therefore an object of the present invention to provide a completely self contained pie and cake cutter which will effectively segment a pie or cake into a predetermined number of pieces of equal size.

Another object of the present invention is to provide a pie and cake cutter which is extremely compact, safe and easy to use, and which will cut the pie or cake without fragmenting the same.

Still another object of the present invention is to provide a combination pie and cake cutter of the type described which can be manufactured in large quantities at a relatively low cost, so as to be readily available for commercial, domestic, and industrial use.

All of the foregoing and still further objects and advantages of the present invention will become apparent from a study of the following specification, taken with the accompanying drawing, wherein:

FIGURE 1 is a perspective view of a pie cutter made in accordance with the present invention;

FIGURE 2 is an enlarged side elevational view of the assembly shown in FIGURE 1;

FIGURE 3 is a plan view of the base portion of the assembly shown in FIGURE 1;

FIGURE 4 is a perspective view of a pie plate forming a part of the present invention;

FIGURE 5 is an enlarged fragmentary cross sectional view showing certain parts of the present invention in actual use;

FIGURE 6 is an enlarged fragmentary cross sectional view of certain other parts of the present invention;

FIGURE 7 is a fragmentary transverse cross sectional view of certain parts of a slightly modified form of construction;

FIGURE 8 is a perspective view of a cutter assembly embodying the modification illustrated in FIGURE 7.

Referring now to the drawing, and more particularly to FIGURES 1 to 6 thereof, a pie cutting apparatus 10 made in accordance with the present invention is shown to include a base 12 having a plurality of diametrically extending and intersecting grooves 14, and three upstanding posts 16, as well as a pair of spaced apart openings 15 which may be used to more accurately position a pie plate thereupon. The uppermost end of each such post 16 is provided with an indent 18, for purposes hereinafter described.

A pie plate 20 also made in accordance with the present invention is shown in FIGURE 4 to include a base 22 having a plurality of diametrically extending grooves 28 which fit within and substantially coincide with the grooves 14 in the base 12. The pie plate 20 is also provided with a plurality of segmental circular side wall portions 24, each separated from the next adjacent segmented portion by means of a groove 26.

A cutter 30, forming another part of the present invention is shown to include an annular band 32 having three outwardly extending webs 34, each of which is provided with a central opening 35 through which the uppermost end of the post 16 is received. Each such web 34 is also provided with a spring detent 36 which is releasably engaged within the indents 18 of the posts 16 to support the cutter in the elevated position illustrated in FIGURES 1 and 2, but which detents 36 are yieldable in response to a downward pressure upon the cutter to allow the diametrically extending flat plate portions 40 thereof to be moved into cutting engagement with the cake or pie 41 carried within the plate 20.

In FIGURES 7 and 8 of the drawing, a slightly modified form of cutter is shown which employs diametrically extending wires 40a, which replace the flat sharpened blades, but which are otherwise operated in substantially the same way.

In actual use, the pie or cake 41 contained within the plate 20 is placed upon the base 12 with the grooves 28 of the pie plate received within the grooves 14 of the base 12. This automatically aligns the slots 26 of the pie plate with the cutter blades 40, 40a of the cutter so that upon downward movement of the cutter 30, the blades 40 or rods or wires 40a are moved through the pie or cake 41, accommodated by the slots 26, and through the bottom of such pie or cake and into the upwardly opening grooves 28. This completely segments the pie or cake, whereupon the pieces may be removed after the cutter has been returned to the elevated position. With the use of the cutter illustrated in FIGURES 7 and 8 of the drawing, the pie or cake may be removed without having to first return the cutter to the elevated position.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A pie plate for use with cutting apparatus having a grooved base and a cutter connected to the base for movement thereto and having blades corresponding to the grooves of the base, comprising a bottom having a plurality of angularly spaced outwardly extending deformations each intersecting the other at a common intersecting point, said deformations being received in the grooves of the base for alinement to receive the blades of the cutter, and a segmented wall extending from the plate bottom with slots alined with the deformations to provide passages for the blades as the cutter moves toward the base and the blades are received in the deformations.

References Cited in the file of this patent

UNITED STATES PATENTS

| | | |
|---|---|---|
| 476,340 | Wagandt | June 7, 1892 |
| 1,453,367 | Schipplock et al. | May 1, 1923 |
| 2,561,274 | Harrington | July 17, 1951 |
| 2,647,549 | Koch | Aug. 4, 1953 |
| 2,707,504 | Hill | May 31, 1955 |
| 2,824,588 | Lyon et al. | Feb. 25, 1958 |

FOREIGN PATENTS

| | | |
|---|---|---|
| 379,926 | Great Britain | Sept. 8, 1932 |